Aug. 14, 1945.  J. J. BLACK  2,382,376
KNOCKDOWN BODY FOR TRAILERS
Filed Sept. 9, 1943  2 Sheets-Sheet 2
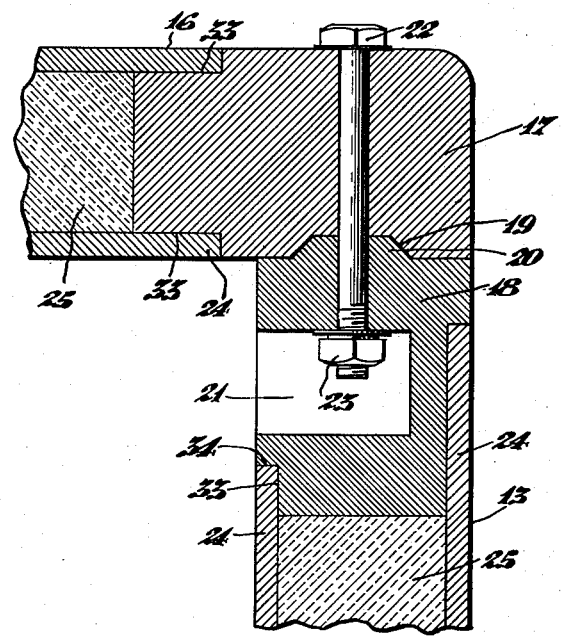
Fig. 2
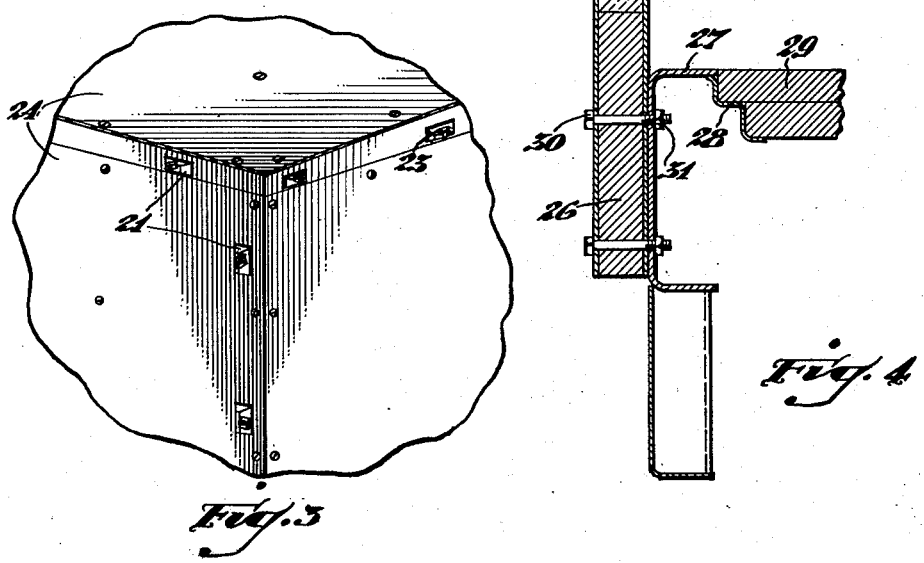
Fig. 3
Fig. 4
INVENTOR.
James J. Black
BY Wood, Arey, Herron & Evans
Attorneys Patented Aug. 14, 1945

2,382,376

UNITED STATES PATENT OFFICE 2,382,376

KNOCKDOWN BODY FOR TRAILERS

James J. Black, Cincinnati, Ohio, assignor to The Trailer Company of America, Cincinnati, Ohio, a corporation of Ohio Application September 9, 1943, Serial No. 501,654

1 Claim. (Cl. 296—27)

This invention relates to trailer bodies and is particularly concerned with a knockdown or prefabricated body which can readily be packed and shipped in packaged form for assembly and attachment to a trailer chassis at the point of destination of the shipment.

The shipment of trailers and trailer bodies to distant points, particularly to foreign countries, has long been handicapped and retarded by the fact that the bulk of the vehicle is so great by comparison with its weight that generally it has been impossible or impractical to store any substantial number of them in the hold of a single vessel. The basic reason for this is, first of all, that trailer bodies must be particularly strong and well constructed to enable them to withstand the shocks and strains to which they are subjected in use. In order to obtain the requisite degree of strength and rigidity it has been considered necessary in the past to assemble the body as a unit at the point of manufacture utilizing various manufacturing processes such as welding and riveting and various types of bracing and reenforcing which have produced bodies which could not readily be knocked down into sections conveniently configurated for shipping. In addition, because of the wide variety of uses for which they are employed trailer bodies have been to a very large extent custom built and the quantity of bodies of any one identical type produced at the same time has never been large in comparison with other types of road vehicles, such as automobiles and trucks.

The thinking of the industry has become so standardized along these lines that it has been difficult for it to appreciate the possibility of fabricating trailer bodies along standardized lines, packaging them so as to utilize a minimum of shipping space, and, after shipment, assembling them at the point of destination to provide a completed body structure which is sufficiently strong and rigid to withstand ordinary usage for a reasonable length of time.

With a view to meeting this problem one of the objects of the present invention has been to provide a trailer body in which the various component parts, such as side walls, end walls and roof, are of a generally standardized construction which enables them to be manufactured in quantity, packed flat for shipping purposes, and subsequently assembled into a completed body having sufficient rigidity and strength for the purposes intended.

Another object has been the provision of side walls, end walls and roof sections so configurated that similar mating joints are obtained at all points and the general rigidity of the completed structure is at least comparable to that obtained by more conventional means of construction.

Another object has been the provision of means for securing the mating sections together along the points of attachment.

Another object has been the provision of means for securing the side walls to a chassis to provide a completely assembled trailer.

Other and further objects and advantages will be apparent from the further and more detailed description of the invention when considered in conjunction with the drawings in which:

Figure 2 is a sectional view through a side wall and the roof particularly illustrating the means provided for joining these two elements and securing them in position.

Figure 3 is a fragmentary perspective view of an upper inside corner of the completed body.

Figure 4 is a sectional view through a side wall and a lower rail member and particularly illustrates the method of attachment of the side walls to a trailer chassis.

Figure 1:
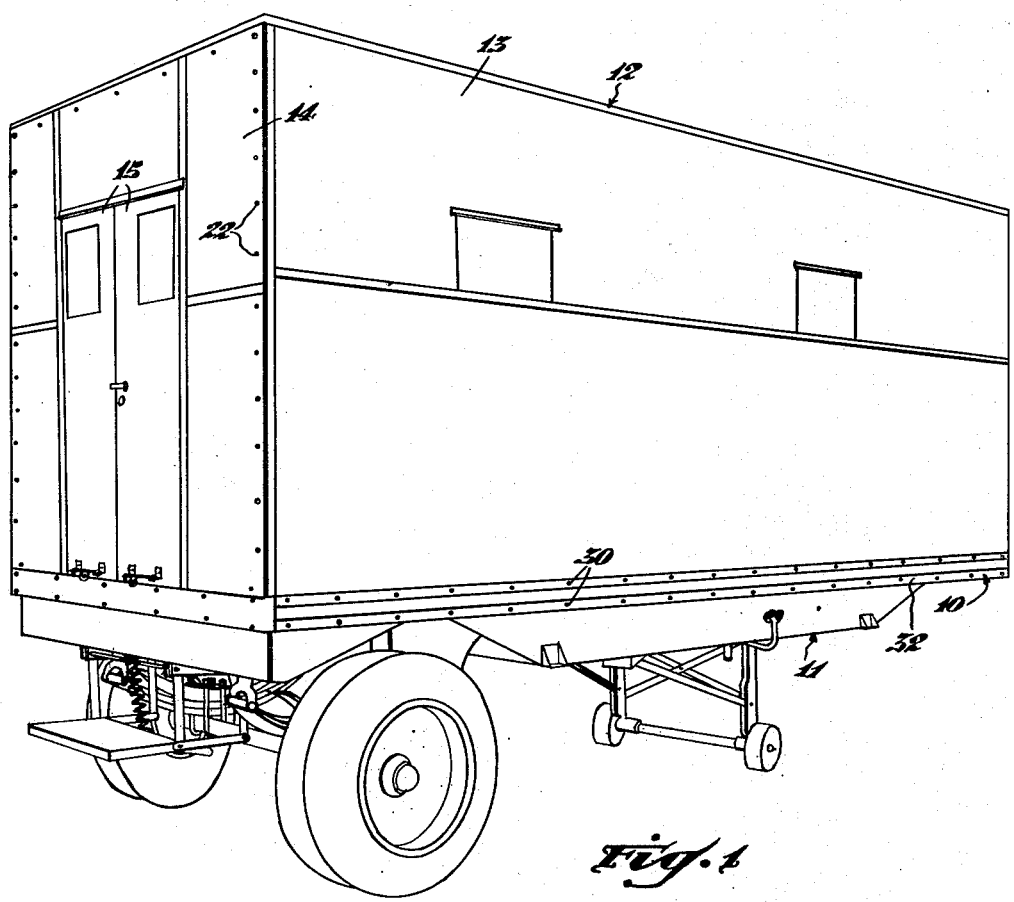
Figure 1 is a perspective view of a trailer body of the preferred type of the invention disposed and secured on a chassis.

Referring now to the drawings for a further and more detailed description of a preferred embodiment of the invention, in Figure 1 a trailer including a separable body and a chassis is indicated generally as 10. The chassis has been designated 11 and the body generally as 12. The side walls of the body, one of which is shown in the drawings, are designated as 13 and the rear wall as 14. It will be noted that door members 15 are disposed centrally of the rear wall and hung in such a way that this entire member, including the doors, may be fabricated and assembled as a single unit. The front wall and top of the body are not shown in the drawings but their construction is substantially similar to that of the other walls except that there is no necessity for the provision of windows and doors on either of these members.

In Figure 2 there is illustrated the means provided for joining a side wall to the roof and this same general type of construction is employed in joining the side walls to the end walls. The roof 16 comprises side rails 17 and end rails of similar construction although these are not shown in the drawings. The side wall 13 includes upper side rail members 18, and similar rail members are employed in the front and rear walls. The side rails 17 of the roof are grooved along their entire length, this groove being designated as 19. A corresponding raised portion 20 on the upper side rails engages in this groove and form a rabbeted or mortise and tenon joint completely around the periphery of the trailer body thereby seating the roof in secure position on the upper rails of the side walls and the front and rear walls. Recesses 21 are formed in the upper side rails at spaced points, and bolts 22 inserted through the rabbeted joint are maintained in position by the nuts 23 disposed in the recesses. The number of bolts utilized and the spacing of the recesses will, of course, depend to a considerable extent on the size and type of body. However, it is recommended that a substantial number be employed. Figure 2 may also be considered to illustrate the method of attachment of the side walls to the end walls, and, in this instance, it is immaterial whether the grooves be formed in the vertical corner posts of the side walls or the end walls.

The combination of the rabbeted joints and bolted connections produces a surprisingly strong and rigid body. A wedging action occurs in the grooves which in and of itself provides considerable fastening strength. When the additional fastening strength of a substantial number of bolts is added the connection is almost as strong as in more conventional types of construction. Since the nuts of all of the bolts are readily accessible from the interior of the vehicle any particular connection which tends to become loosened during wear may be tightened as desired.

The balance of the construction of the wall and roof members in the preferred embodiment includes panel members 24 secured on both the inside and outside of the upper side rails along the entire length thereof and similar panel members extending across the side rails and forming the roof. Assuming the construction of the rails and posts from hard lumber, the panels in each case may be Masonite or plywood and may be screwed in position in the general manner indicated in Figure 3. These materials are not of the essence of the invention however, and, if desired, steel panels may be employed with equal effectiveness.

In the preferred embodiment illustrated, insulation 25 is inserted in the roof and side and end walls in the space between the upper or lower rails or side rails as the case may be. The preferred embodiment employing wooden post and rail members, plywood or Masonite panels and insulation is particularly well adapted to the purposes of the invention because it is extremely light in comparison with other types of bodies, while at the same time sufficiently strong and rugged for the purposes intended. It is also well adapted to a rapid and standardized fabrication.

The details of the wall or panel construction shown in Figure 2 differ slightly from that shown in Figure 3. In Figure 2 the panels in each case are inserted in grooves 33 in the rail members and provide with the inner and outer surfaces of the rail members a surface which is substantially flush. This tends to increase the strength of the structure and improve its appearance. The inner panel members may preferably have their upper edges terminate at a point such as 34 (Figure 2) which is below the lower edge of the recess 21 thereby obviating the necessity for cutting holes in the paneling to provide access to the bolt heads and resultantly facilitating the assembly.

In Figure 4 there is illustrated the method of attachment of the lower side rails to the side rails of the chassis, the same construction being employed in the case of the front and rear walls. The lower side rail designated 26 extends downwardly below the level of the top of the chassis 11. The side rails of the chassis designated as 27 may be generally C-shaped and may have depending therefrom toward the interior of the vehicle a rail member 28 of stepped construction. This member may be welded to the underside of the side rail of the chassis in the manner illustrated in Figure 4. Floor elements 29 are disposed on the steps formed on the member 28 so as to then form with the upper arm of the rail 27 a substantially flush construction. The floor elements may be secured to each other and to the rail 28 by various known means of attachment. The lower side rails 26 are secured to the vertical section of the rail 27 by bolts 30 inserted through the lower side rails of the body and chassis and fastened by nuts 31 on the interior of the chassis rail. A double row of these bolts are employed preferably, and, if desired, they may be inserted through double rub rails 32 as indicated generally in Figure 1. This tends to prevent loosening of the bolts and facilitates tightening should it occur.

It will be noted that all of the elements of the body are secured to each other and the body itself is secured to the chassis solely by means of these bolted connections. This enables the ready assembly of the body to the chassis at practically any destination point to which it may be shipped including those where only unskilled labor is available for the assembly work.

The provision of wall and roof members, all of which are substantially flat and lacking in exterior configuration, enables the body to be packed into a relatively small unit which in shipment will utilize a minimum of shipping space.

The preferred embodiment illustrated is not necessarily intended for extremely long or hard usage but it is sufficiently strong and rigid for moderate usage over a fairly extensive period of time, such as, for example, in a military campaign. In the event that certain of the elements should become damaged or destroyed, because of the standardized and comparatively cheap construction it is entirely practical to replace the single damaged element or elements with others thereby completely restoring the utility of the vehicle.

While the embodiment of the invention described is the preferred one, it is obvious that various changes and modifications may be made in the construction without departing from the substance of the invention as described in the ensuing claims.

Having fully described my invention, I claim:

In a knockdown body for trailers, panels forming end walls, side walls and a roof, each panel comprising marginal structural frame members and relatively thin panel sheets recessed in the frame members on the opposed faces thereof and providing therebetween cavities for the reception of insulating materials, the mating edges of each adjoining pair of panels having correspondingly raised and grooved portions forming mortise and tenon joints at the corners of the body and continuously around the top, one panel at each joint having a plurality of recesses formed in the structural frame member thereof at spaced points, said points being disposed between the edge of the panel and the edge of the adjacent panel sheet, and fastening members extending from the recesses through the mortise and tenon joint to the exterior of the other sheet forming the joint, said recesses being disposed on the interior of the body to facilitate periodical tightening of the fastening members.

JAMES J. BLACK.